US008430052B2

(12) United States Patent
Nihra et al.

(10) Patent No.: US 8,430,052 B2
(45) Date of Patent: Apr. 30, 2013

(54) FLAG-MOUNTING DEVICE FOR VEHICLES

(76) Inventors: Thomas E. Nihra, Warren, MI (US); Deni H. Nihra, Warren, MI (US)

( * ) Notice: Subject to any disclaimer, the term of this patent is extended or adjusted under 35 U.S.C. 154(b) by 458 days.

(21) Appl. No.: 12/763,490

(22) Filed: Apr. 20, 2010

(65) Prior Publication Data

US 2010/0263583 A1 Oct. 21, 2010

Related U.S. Application Data

(60) Provisional application No. 61/170,748, filed on Apr. 20, 2009.

(51) Int. Cl.
*G09F 17/00* (2006.01)
*B60R 11/00* (2006.01)

(52) U.S. Cl.
USPC .......................................... 116/173; 116/28 R

(58) Field of Classification Search .................. 116/173, 116/28 R; 224/319; 248/228.6, 230.6, 231.71, 248/292.12, 310, 514, 521, 538, 539, 540, 248/541; 40/591, 592
See application file for complete search history.

(56) References Cited

U.S. PATENT DOCUMENTS

| | | | | | |
|---|---|---|---|---|---|
| 559,951 | A * | 5/1896 | Rhind et al. | ............... | 248/230.6 |
| 640,446 | A * | 1/1900 | Converse | ....................... | 248/514 |
| 838,937 | A * | 12/1906 | Batchelder | ...................... | 40/589 |
| 943,747 | A * | 12/1909 | Hickman | ........................ | 52/295 |
| D177,955 | S * | 6/1956 | Arbogast | ........................ | D8/355 |
| 3,162,409 | A * | 12/1964 | Straayer et al. | ............... | 248/514 |
| 3,931,919 | A * | 1/1976 | Gerber et al. | ................. | 224/324 |
| 4,739,575 | A * | 4/1988 | Behrle | ........................... | 43/21.2 |
| D306,396 | S * | 3/1990 | Brushaber | ...................... | D8/355 |
| D335,254 | S * | 5/1993 | Carter | ............................ | D8/354 |
| 5,233,938 | A | 8/1993 | Lalo | | |
| 5,588,630 | A * | 12/1996 | Chen-Chao | ................... | 248/514 |
| 5,657,914 | A * | 8/1997 | Stapleton | ...................... | 224/319 |
| 5,975,009 | A * | 11/1999 | Nihra et al. | ................... | 116/173 |
| 6,085,687 | A | 7/2000 | Chester | | |
| 6,568,644 | B2 * | 5/2003 | Pedersen | .................. | 248/229.13 |
| 6,796,063 | B1 | 9/2004 | Bryant | | |
| 6,898,893 | B1 * | 5/2005 | Mukdaprakorn | .............. | 43/21.2 |
| 6,988,701 | B1 * | 1/2006 | Lin | ............................... | 248/521 |
| 7,320,480 | B2 * | 1/2008 | Maruyama et al. | ........... | 280/779 |
| 7,357,283 | B2 * | 4/2008 | Settelmayer | .................. | 224/322 |
| 7,448,590 | B1 * | 11/2008 | Holton | .......................... | 248/534 |
| 7,857,274 | B1 * | 12/2010 | Parks | ............................ | 248/310 |
| 2002/0125282 | A1 * | 9/2002 | Laverack et al. | ............. | 224/319 |
| 2005/0151040 | A1 * | 7/2005 | Hsu | .............................. | 248/214 |
| 2006/0053667 | A1 | 3/2006 | Anderson | | |

* cited by examiner

*Primary Examiner* — R. A. Smith
(74) *Attorney, Agent, or Firm* — The Weintraub Group, P.L.C.

(57) ABSTRACT

A positionally-adjustable flag-mounting device for use on vehicles. The flag mounting device includes a base member for receiving a flagstaff base and a mounting clip that removably attaches to a vehicle. The mounting clip is rotatably attached to the base member. The mounting clip includes means for removably mounting the mounting clip to a portion of the vehicle.

6 Claims, 4 Drawing Sheets

FIG 2
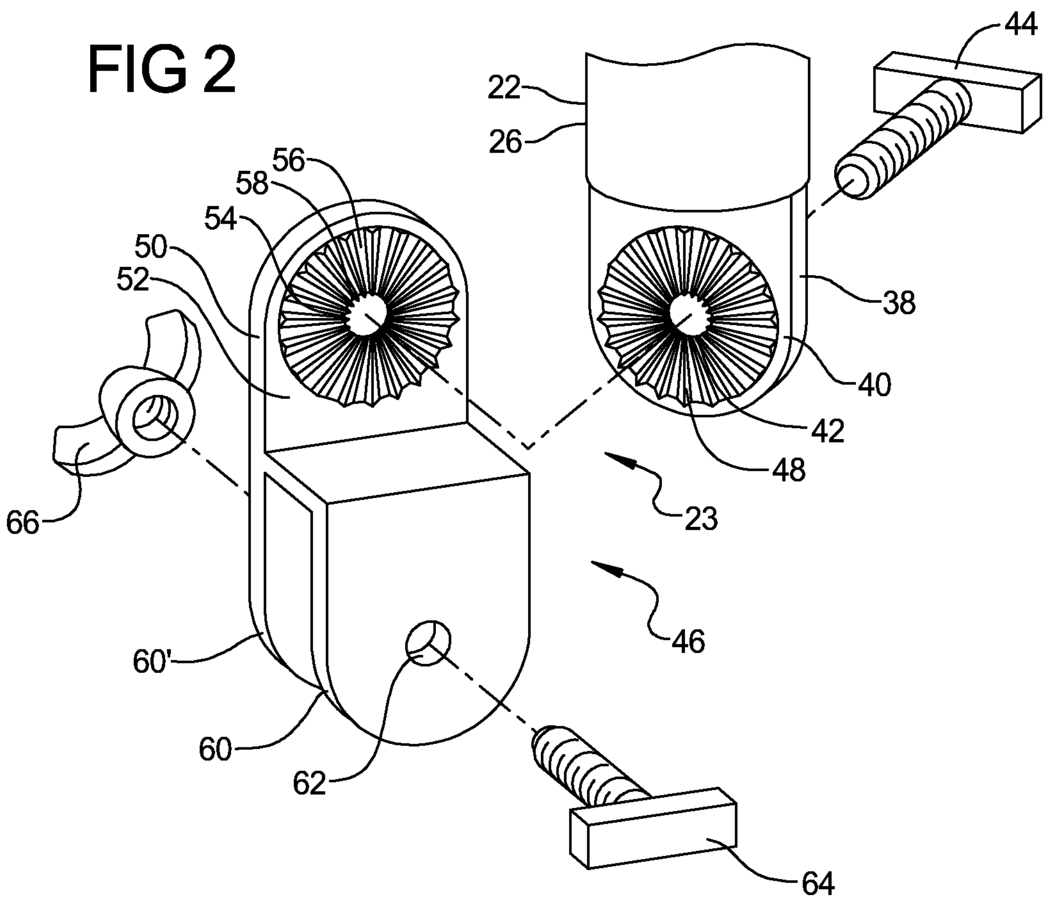
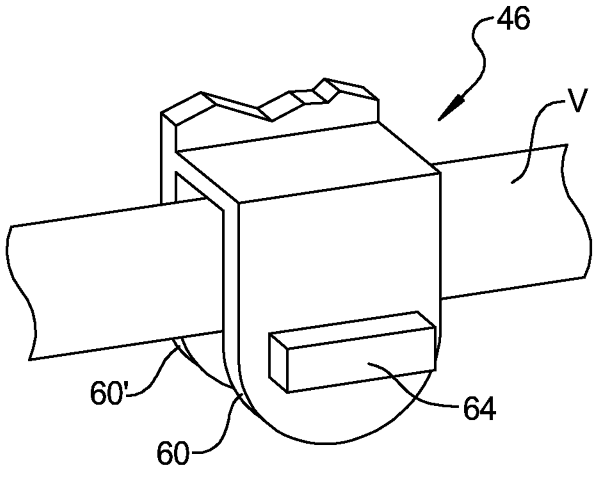
FIG 3

FIG 4
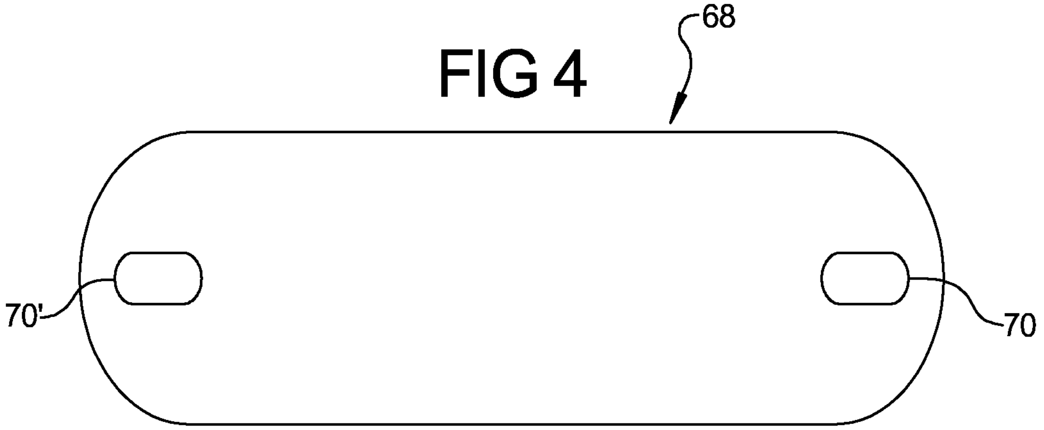
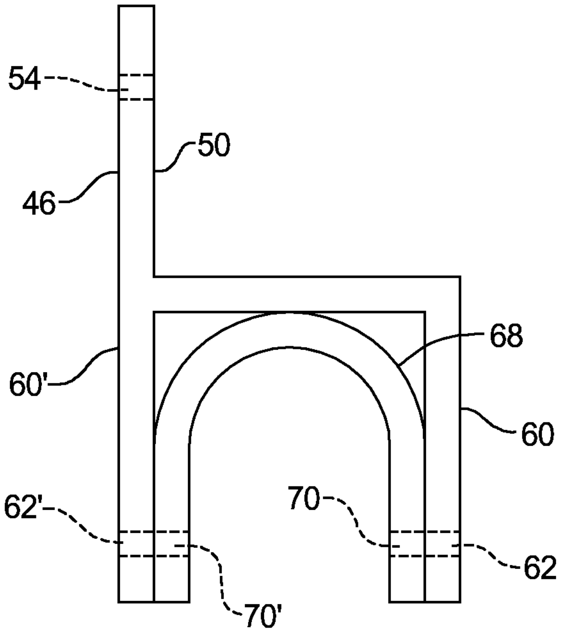
FIG 5

FIG 6
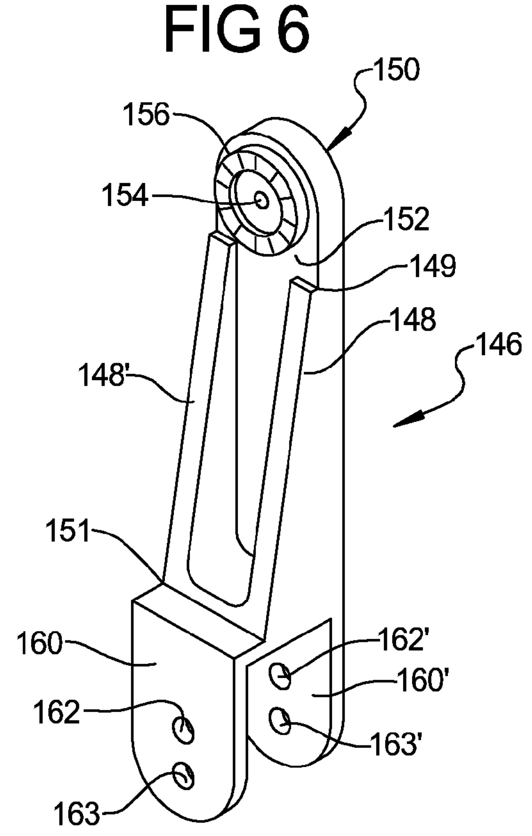
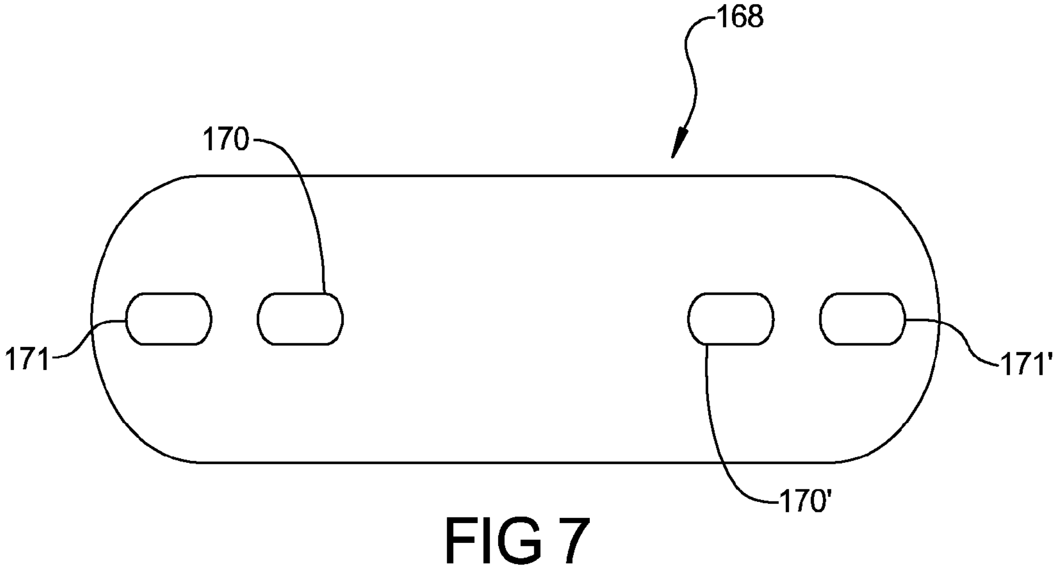
FIG 7

FLAG-MOUNTING DEVICE FOR VEHICLES

CROSS REFERENCE TO RELATED APPLICATION

This application claims the benefit of U.S. Provisional Application 61/170,748, which was filed on Apr. 20, 2009, the entire disclosure of which is hereby incorporated by reference.

BACKGROUND OF THE INVENTION

1. Field of the Invention

The present invention pertains to a flag-mounting device. More particularly, the present invention pertains to a flag-mounting device for use on vehicles. Even more particularly, the present invention pertains to a positionally-adjustable flag-mounting device for use on vehicles.

2. Description of the Prior Art

The use of devices for mounting flags onto vehicles is well-known in the art. Existing flag-mounting devices which are well-known and which fixedly mount a flag and flagstaff onto a vehicle are found, for example, in U.S. Pat. No. 6,085,687 to Chester and U.S. Pat. No. 6,796,063 to Bryant. The flag-mounting devices disclosed by Chester and Bryant require the flagstaff to be fixed in a generally vertical orientation. The disclosed devices also are specifically for use in mounting the flag onto a structure having horizontal slats, such as a roof rack.

Devices for mounting flags onto the windows of vehicles are also well-known, such as disclosed in U.S. Pat. No. 5,233,938 to Lalo. Lalo discloses a flag-mounting device which mounts to the window of a vehicle such as a car. The flag-mounting device disclosed by Lalo positions the flag in a fixed generally vertical orientation.

It is also well-known that flag-mounting devices may be mounted to a trailer hitch, such as shown in U.S. Patent Publication No. 2006/0053667 to Andersen. Although the flag-mounting device in Andersen is rotatably secured to the vehicle, it is specifically designed for mounting onto a vehicle's trailer hitch.

It is readily seen that many of the existing devices for mounting a flag onto a vehicle have specific applications, and the devices are not especially versatile or adaptable. Furthermore, many of the flag-mounting devices do not allow the position of the flagstaff to be adjusted in relation to the vehicle. Therefore, a need exists for a versatile flag-mounting device which may be mounted to a vehicle in a variety of ways, and which is positionally-adjustable along several axes.

The present invention, as is detailed hereinbelow, seeks to resolve these issues by providing a flag-mounting device for vehicles which is both versatile and positionally-adjustable along more than one axis, and is also easily secured to and removed from the vehicle.

SUMMARY OF THE INVENTION

The present invention provides a flag-mounting device comprising:

a) a staff base, the staff base being generally cylindrical and elongated along an axis, the staff base having a distal portion and a proximal portion, the staff base further having an opening extending into the distal portion of the staff base to receive a flag staff;

b) a base tab affixed to the proximal portion of the staff base and extending outwardly therefrom;

c) a mounting clip, the mounting clip having a clip tab extending outwardly therefrom, and the mounting clip further having means for removably mounting the mounting clip onto a surface; and d) means for securing the base tab to the clip tab.

The present invention has utility for being mounted onto a variety of suitable surfaces. However, the present invention has particular utility for being mounted onto a vehicle, and even more particularly, for being mounted onto the pillar or post of a golf cart.

For a more complete understanding of the present invention, reference is made to the following detailed description and accompanying drawings. In the drawings, like reference characters refer to like parts throughout the views in which:

BRIEF DESCRIPTION OF THE DRAWINGS

FIG. 2 is an enlarged exploded view showing the clip tab and the mounting clip used in the practice of the present invention;

FIG. 3 is a cutaway perspective view showing the mounting clip hereof mounted onto a portion of a vehicle;

FIG. 4 is a top view of a support pad used for adding stability when the mounting clip in mounted onto a curvilinear portion of a vehicle;

FIG. 5 is a side view of the mounting clip hereof having a support pad disposed between the mounting tabs and aligned for use in mounting the mounting clip onto a vehicle.

FIG. 6 is a perspective view of an alternative embodiment of a mounting clip used in the practice of the present invention; and FIG. 7 is a top view of a support pad used with the mounting clip of FIG. 6.

DETAILED DESCRIPTION OF THE PREFERRED EMBODIMENT

Figure 1:
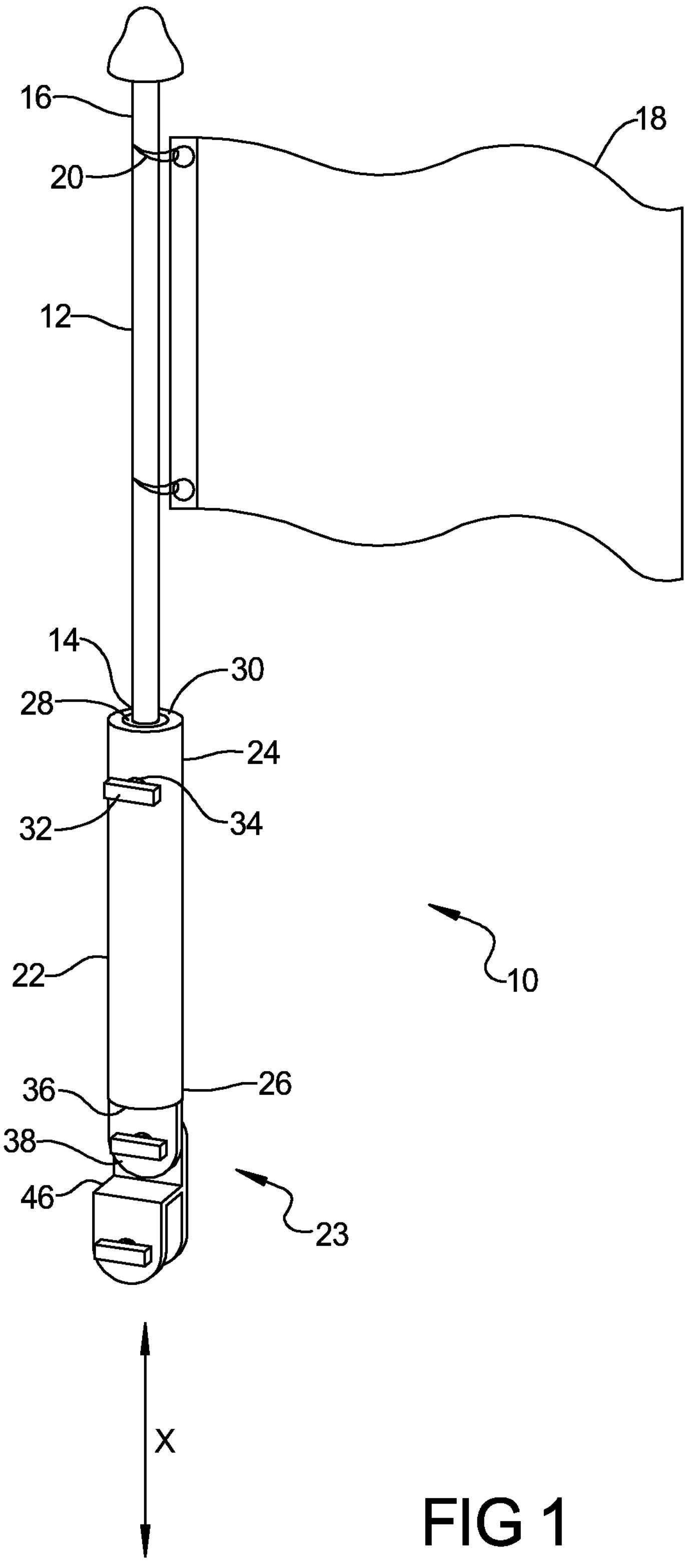
FIG. 1 is a perspective view of a preferred embodiment of the present invention hereof.

In accordance with the present invention and as shown generally in FIG. 1, there is provided a flag-mounting device 10 having a flagstaff 12. The flagstaff 12 has a proximal portion 14 and a distal portion 16. The flagstaff 12 is formed from any suitable material which is well-known in the art, such as wood, plastic, or metal.

A flag 18 is secured to the flagstaff 12. It should be noted that as used herein the term "flag" is intended to indicate a banner, pennant, sign, streamer, or the like.

Referring again to the drawing, the flag 18 is removably secured to the distal portion 16 of the flagstaff 12 by means which are well-known in the art, such as clips, rings, or the like. In addition, the flag 18 may be mounted to the flagstaff 12 by a retaining mechanism 20, such as found in U.S. Pat. No. 5,975,009 to Nihra et al., the disclosure of which is incorporated by reference herein.

The flag-mounting device 10 also has a staff base 22. The staff base 22 is generally elongated and cylindrical in shape, and extends along an axis x. The staff base 22 has a distal portion 24 and a proximal portion 26. The staff base 22 may be formed from any variety of suitable materials, such as wood, metal, or plastic. Preferably the staff base 22 is formed from a plastic such as high-density polyethylene.

As shown, the distal portion 24 of the staff base 22 has an end 30. An opening 28 extends into the end 30. The opening 28 may be coaxially aligned with the axis of the staff base 22. The depth of the opening 28 is sufficiently deep to securely receive the proximal portion 14 of the flagstaff 12 as seen in FIG. 1. The opening 28 preferably does not extend the entire length of the staff base 22.

Optionally, the end 30 may include a removable circular cap (not shown) with an aperture therethrough. The circular cap frictionally attaches to the end 30 and is made from a suitable rigid material such as metal or plastic. A flexible retaining tab (not shown) may be attached to the cap and have a distal end attachable to a portion of the staff base 22 so the cap is not lost if removed from the end 30.

The proximal portion 14 of the flagstaff 12 is inserted into the opening 28, and removably secured therein. The flagstaff 12 is secured within the opening 28 of the staff base 22 by any suitable means which are well-known in the art, such as being frictionally fitted, secured by a fastener 32 such as a bolt and nut, a wingbolt and nut, or the like. When the flagstaff 12 is removably secured by threaded means such as the fastener 32, as shown in FIG. 1, the distal portion 24 of the staff base 22 can have a tapped hole 34 which is oriented generally transversely to the axis of the staff base 22, and extends into the side of the staff base 22. As the fastener 32 is screwed into the tapped hole 34, the leading end of the fastener 32 is pressed firmly against the flagstaff 12, thus securing the flagstaff 12 into the opening 28.

The proximal portion 14 of the flagstaff 12 may also have a through-hole (not shown). As the fastener 32 is screwed into the through-hole, the leading end of the fastener 32 passes into and through the flagstaff 12, thus securing the flagstaff 12 to the staff base 22. In this arrangement, it is understood that the fastener 32 can include a threaded coupler, such as a nut, which threadably retains the leading end of the fastener 32 to secure the flagstaff 12 in position.

The proximal portion 26 of the staff base 22 has an end 36. A base tab 38 extends outwardly from the proximal portion 26 of the staff base 22. The base tab 38 is affixed to the staff base 22, and may be integrally formed with the staff base 22. As shown in greater detail in FIG. 2, the base tab 38 can include a planar face 40 and a through-hole 42 that extends through the planar face 40. The hole 42 is generally oriented transversely to the planar face 40. The through-hole 42 enables a fastener 44 to be used to secure the base tab 38 to a mounting clip 46, as described in further detail below.

The base tab 38 includes means for securing 23 for securing the staff base 22 to a mounting clip 46, as discussed below. The means 23 allows the staff base 22 and the mounting clip 46 to be positioned or oriented with respect to each other and then secured into a desired position.

As shown in FIG. 2, the means for securing 23 can include a toothed member 48. The toothed member 48 is integrally formed with and protrudes outwardly from the planar face 40 of the base tab 38. The toothed member 48 is generally circular in shape, and is coaxially aligned with the through-hole 42 that extends through the planar face 40.

Referring now to FIGS. 2 and 3, and as noted above, the flag-mounting device 10 also comprises the mounting clip 46. The mounting clip 46 is secured to the staff base 22 and is used to secure the staff base 22 to a vehicle or other item or surface. For purposes of description, the ensuring description is with reference to a vehicle V. The mounting clip 46 is adjustably mounted onto a portion of a vehicle V, such as a golf cart, as shown. The mounting clip 46 is formed from a material which is relatively tough, yet flexible, and can be placed under stress without fracturing. Preferably the mounting clip 46 is formed from a plastic such as high-density polyethylene.

As shown in FIG. 2, the mounting clip 46 has an affixed clip tab 50 which extends outwardly therefrom. The clip tab 50 has a planar face 52 and a through-hole 54 that extends through the clip tab 50. The hole 54 is generally oriented transversely to the face 52. Preferably, the clip tab 50 has a toothed member 56 which comprises a part of the means for securing 23. The toothed member 56 is integrally formed with and protrudes outwardly from the planar face 52 of the clip tab 50. The toothed member 56 is generally circular in shape, and is coaxially aligned with the through-hole 54 that extends through the clip tab 50.

In use, the tabs 38 and 50 are positioned adjacent each other with their respective faces abutting each other, with the holes 42,54 being aligned. A fastener 44, such as a bolt, screw, wingbolt, or the like, extends through the aligned holes 42,54. A coupler 58, such as a nut, may be integrally formed within the hole of one of the tabs. Alternatively, the coupler 58 may be separate from the clip tab 50 and attached to the end of the fastener 44 as it protrudes through the holes 42,54. The fastener 44 is securely tightened to the coupler 58, thereby rotatably securing the base tab 38 to the clip tab 50.

When each of the base tab 38 and the clip tab 50 have a toothed member 48,56 integrally formed therewith and protruding outwardly from each of their respective planar faces 40,52, the toothed members 48,56 complement each other and, when mated, provide significant rotational resistance about the through-holes 42,54 when the planar faces 40,52 are securely fastened together.

The mounting clip 46 also has means for removably mounting 59 for removably mounting the mounting clip 46 onto the vehicle V. Any suitable means may be used, such as a spring-loaded jaw-type clamp (not shown), a C-clamp (not shown), or the like. Preferably, the mounting clip 46 has a pair of opposed mounting tabs 60,60' which extend outwardly from the mounting clip 46, as seen in FIGS. 2 and 3. Each of the mounting tabs 60,60' has a through-hole 62,62' respectively, and the holes 62,62' are generally coaxial to each other. A threaded fastener 64, such as a bolt, screw, wingbolt, or the like, extends through the mounting tab holes 62,62'. A coupler 66 complements the leading end of the fastener 64, and is used to secure the fastener in location. The coupler 66 may be any suitable type of coupler, such as a nut or a wingnut. The coupler 66 may also be integrally formed within one of the holes 62,62' of the mounting tabs 60,60'.

As seen in FIG. 3, the opposed mounting tabs 60,60' are used to envelop and surround a fixed portion of the vehicle V, such as a pillar, drip rail, or the like. When the fastener 64 is inserted through the holes 62,62' and fastened to the coupler 66, the mounting tabs 60,60' are pulled or drawn together in closing relation to tightly surround and grip the portion of the vehicle V.

As shown, the mounting tabs 60,60' and the mounting clip 46 form a generally rectangular mounting structure which is especially adapted for mounting the flag-mounting device 10 onto a portion of a vehicle having a rectangular-shaped cross-section.

However, in order to provide additional stability when mounting the flag-mounting device 10 onto an object which has a generally curvilinear cross-section, a support pad 68 may be provided, such as shown in FIG. 4. The support pad 68 is generally oblong and has opposed openings or slots 70,70' on each end. The support pad 68 may be made from any suitable pliable material, such as low-density polyethylene, rubber, polyurethane, silicone rubber, or the like.

As shown in FIG. 5, in use, the support pad 68 is folded, or shaped, into a semi-circular arc and inserted between the opposed mounting tabs 60,60'. The opposed openings 70,70' are generally aligned with the mounting tab holes 62,62' so that the fastener 64 may be inserted through both the mounting tab holes 62,62' and the support pad openings 70,70'.

In use, the opposed mounting tabs 60,60' and the support pad 68 are placed around any suitable portion of the vehicle V having a generally circular cross-section. The fastener 64 is inserted through the mounting tab holes 62,62' and the support pad openings 70,70'. The fastener 64 and coupler 66 are then screwed together in closing relation to each other, thus drawing the mounting tabs 60,60' together securely toward and around the portion of the vehicle V. The support pad 68 provides a relatively continuous contact surface around the rounded portion of the vehicle V, thus greatly increasing the amount of friction between the support pad 68 of the mounting clip 46 and the vehicle V.

Referring now to FIG. 6, an alternative embodiment of the mounting clip is generally identified at 146. The mounting clip 146 is secured to the staff base 22 in a manner similar to the mounting clip 46 and is also used to secure the staff base 22 to the vehicle V. The mounting clip 146 is preferably formed from a tough and flexible material, such as a high-density polyethylene plastic.

The mounting clip 146 includes a pair of opposed outwardly protruding support arms, or ribs, 148,148' having a clip tab 150 affixed therebetween, and a pair of opposed mounting tabs 160 and 160' extending opposite the support arms 148,148'. The support ribs 148,148' extend longitudinally and have a first end 149 terminating near the clip tab 150, and second end 151 terminating near the mounting tabs 160,160'. The support ribs 148,148' are preferably formed integrally with the mounting clip 146.

The clip tab 150 has a planar face 152 with a through-hole 154 transversely extending therethrough. The clip tab 150 preferably includes an integrally formed circular toothed member 156 protruding outwardly from the planar face 152. The circular toothed member 156 is coaxially aligned with the through-hole 154 to receive the fastener 44 and rotatably secure the base tab 38 of the staff base 22 to the clip tab 150. Preferably, the base tab 38 and the clip tab 150 each have a complementary toothed member 48,156 to mate and provide rotational resistance when securely fastened together. A coupler (not shown), such as a nut, may be integrally formed within the hole of the clip tab 150 to securely receive the leading end of the fastener 44 and provide increased attachment between the clip tab 150 and the base tab 38. Alternatively, the coupler may be separate from the clip tab 150 and attached to the end of the fastener 44 as it protrudes through the holes 42,154.

The mounting clip 146 includes the pair of opposed mounting tabs 160,160' to removably mount the mounting clip 146 to the vehicle V or other object. Each of the mounting tabs 160,160' has coaxially aligned first through-holes 162,162' and second through-holes 163,163' respectively. The threaded fastener 64 extends through either of the first through-holes 162,162' or the second through-holes 163,163', thus offering two attachment options when securing the mounting clip 146 to a vehicle or other object. The coupler 66 receives the leading end of the fastener 64 or may optionally be integrally formed within one or more of the first through-holes 162,162', the second through-holes 163,163'.

To provide additional stability when mounting the mounting clip 146 onto an object having a generally curved cross-section, a support pad 168 may be provided as illustrated in FIG. 7. The support pad 168 is similar to the support pad 68, except the support pad 168 includes a first pair of opposed slots 170,170' and a second pair of opposed slots 171,171'. The support pad 168 is folded into a semi-circular arc and inserted between the opposed mounting tabs 160,160' such that first opposed slots 170,170' align with the first through-holes 162,162' and the second opposed slots 171,171' align with the second through-holes 163,163'.

In use, the opposed mounting tabs 160,160' and the support pad 168 are placed around a portion of the vehicle V having a generally circular cross-section, such as a pillar, drip rail, or other similar surface. The fastener 64 is inserted through either the mounting tab holes 162,162' or 163,163' depending on the size of the portion of the vehicle being attached to. A smaller sized portion of the vehicle will utilize the first through-holes 162,162', while a larger sized portion will utilize the second through-holes 163,163'. The fastener 64 will extend through either the first support pad slots 170,170' or the second support pad slots 171,171' depending on the mounting tabs chosen for use. The fastener 64 and coupler 66 are then screwed together in closing relation to each other, thus drawing the mounting tabs 160,160' together securely toward and around the portion of the vehicle V. The support pad 168 provides a relatively continuous contact surface around the rounded portion of the vehicle greatly increasing the amount of friction between the support pad 168, the mounting clip 146 and the vehicle V.

It is to be appreciated that the support pad provides the flag-mounting device with greater versatility and adaptability in mounting the flag-mounting device onto various surfaces and portions of vehicles.

It is also to be appreciated that the flag and flag-mounting device may be used in a manner in which the flagstaff may be quickly and easily removed from the staff base. This is advantageous when it is desirable to either lower the flag or place the flag and flagstaff in storage.

In addition, the flag-mounting device allows for great versatility and adaptability in mounting the flagstaff and flag. The mounting clip may be quickly and easily mounted onto a vehicle. The mounting clip may also be mounted at various orientations about the axis of the portion of the vehicle upon which it is mounted. As such, the mounting clip provides great adjustability in mounting and orienting the flag and flagstaff.

Furthermore, the mounting clip and the staff base are rotatably adjustable in relation to each other. Thus, the flag-mounting device provides further adjustability in orienting the flagstaff in relation to the portion of the vehicle upon which it is mounted.

It should be understood that the present invention is not limited to the specific aspects described above. The elements of the flag-mounting device may be formed from a variety of suitable materials. In addition, any number of suitable well-known means may be used for rotatably securing the base tab to the mounting clip and the mounting clip to the vehicle.

As noted above, the present invention may be mounted onto a variety of locations on a golf cart, for instance, the roof pillar, the roof dripline, a wireframe basket, and so forth.

The present invention may also be used in a manner in which two flag-mounting devices are used to mount a single flag, or banner, wherein the flag-mounting devices are each secured to opposing ends of the flag or banner.

As is apparent from the preceding, the present invention provides a flag-mounting device for vehicles which is both versatile and positionally-adjustable along more than one axis, and is also easily attached to and removed from the vehicle.

Having, thus, described the invention, what is claimed is:

1. A device for mounting a flag to a vehicle comprising:

(a) a staff base, the staff base being generally cylindrical and elongated along an axis, the staff base having a distal portion and a proximal portion, the staff base further having an opening extending into the distal portion of the staff base to receive a flag staff;

(b) a base tab affixed to the proximal portion of the staff base and extending outwardly therefrom;

(c) a mounting clip, the mounting clip having a clip tab extending outwardly therefrom, a fastener, and a pair of opposed mounting tabs, the mounting tabs each having a concentric through-hole to accept the fastener, the opposed mounting tabs being positionable on either side of a portion of the vehicle, wherein the fastener is insertable through the concentric through-holes and tightened to draw the mounting tabs toward each other to secure the pair of opposed mounting tabs around a portion of the vehicle;

(d) a pliable support pad having a pair of slots therein, the support pad being shaped as a semi-circular arc and positioned between the mounting tabs such that the through-holes and the pair of slots are concentrically aligned; and (e) means for securing the base tab to the clip tab.

2. The flag-mounting device of claim 1 wherein the base tab has a planar surface, and the means for securing comprises a first toothed member integrally formed on the planar surface of the base tab and extending therefrom.

3. The flag-mounting device of claim 2 wherein the clip tab has a planar surface, and the means for securing comprises a second toothed member integrally formed on the planar surface of the clip tab, the first and second toothed members being securable in locking interengagement.

4. The flag-mounting device of claim 1 wherein the mounting tabs each further include a second concentric through-hole to accept the fastener.

5. The flag mounting device of claim 4 wherein the pliable support pad has a second pair of slots therein, and the second concentric through-holes and the second pair of slots are concentrically aligned.

6. A device for mounting a flag to a vehicle comprising:

(a) a staff base having a distal portion and a proximal portion, the distal portion configured for attachment to a flag staff, and a base tab secured to the proximal portion;

(b) a mounting clip secured to the base tab of the staff base, the mounting clip having a pair of opposed mounting tabs, each mounting tab having a concentric through-hole to accept a fastener, the opposed mounting tabs being positionable on either side of a portion of the vehicle, wherein the fastener is insertable through the concentric through-holes and tightened to draw the mounting tabs toward each other to secure the pair of opposed mounting tabs around a portion of the vehicle; and (c) a pliable support pad having a pair of slots therein, the support pad being shaped as a semi-circular arc and positioned between the mounting tabs such that the through-holes and the pair of slots are concentrically aligned.

* * * * *